United States Patent
Kang et al.

(10) Patent No.: US 7,429,989 B2
(45) Date of Patent: Sep. 30, 2008

(54) MOBILE COMMUNICATION TERMINAL CAPABLE OF EDITING AVATAR MOTIONS AND METHOD FOR EDITING AVATAR MOTIONS

(75) Inventors: Tae-Young Kang, Uijeongbu-si (KR); Joon-Sang Baek, Seoul (KR); Byeong-Cheol Hwang, Seoul (KR); Bong-Hee Kim, Goyang-si (KR); Heuj-Bae Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 238 days.

(21) Appl. No.: 11/114,818

(22) Filed: Apr. 26, 2005

(65) Prior Publication Data

US 2005/0253850 A1  Nov. 17, 2005

(30) Foreign Application Priority Data

May 14, 2004  (KR)  ........................ 10-2004-0034176

(51) Int. Cl.
*G06T 13/00* (2006.01)

(52) U.S. Cl. ........................ 345/473; 715/706; 715/752; 715/753; 726/105; 379/202.01

(58) Field of Classification Search ................ 345/473; 379/202.01; 715/706, 752, 753; 725/105

See application file for complete search history.

(56) References Cited

U.S. PATENT DOCUMENTS

| 6,388,665 B1* | 5/2002 | Linnett et al. ................ 345/473 |
| 2004/0047461 A1 | 3/2004 | Weisman et al. |
| 2004/0060067 A1* | 3/2004 | Yi .............................. 725/105 |
| 2004/0085259 A1 | 5/2004 | Tarlton et al. |

FOREIGN PATENT DOCUMENTS

| EP | 1 349 351 | 10/2003 |
| WO | WO 03/010986 | 2/2003 |

* cited by examiner

*Primary Examiner*—Kimbinh T Nguyen
(74) *Attorney, Agent, or Firm*—The Farrell Law Firm, PC (57) ABSTRACT

A mobile communication terminal capable of editing avatar motions. The mobile communication terminal includes a memory and a controller. The memory stores a plurality of commands corresponding respectively to a plurality of avatar motions. The plurality of commands are associated with a plurality of numerals, respectively. The controller displays specific avatar motions of the plurality of avatar motions in order. The specific avatar motions correspond respectively to numerals included in a phone number corresponding to an incoming or outgoing call if the incoming or outgoing call is performed.

8 Claims, 8 Drawing Sheets

MOBILE COMMUNICATION TERMINAL CAPABLE OF EDITING AVATAR MOTIONS AND METHOD FOR EDITING AVATAR MOTIONS

PRIORITY

This application claims priority to an application entitled "MOBILE COMMUNICATION TERMINAL CAPABLE OF EDITING AVATAR MOTION AND METHOD FOR EDITING AVATAR MOTIONS", filed in the Korean Intellectual Property Office on May 14, 2004 and assigned Ser. No. 2004-0034176, the contents of which are hereby incorporated by reference.

BACKGROUND OF THE INVENTION

1. Field of the Invention

The present invention relates to a mobile communication terminal and a method of utilizing the same, and more particularly to a mobile communication terminal capable of editing avatar motions and a method for editing avatar motions.

2. Description of the Related Art

As mobile communication terminals become more common in use, various functions implemented therein have been developed to offer convenience and pleasure to users. Recently, a function to generate and edit an avatar to have a predetermined style has been added to a mobile communication terminal. Such an avatar can be implemented as a three-dimensional image as well as a two-dimensional one.

However, an avatar image shown in the prior art mobile communication terminal is displayed only as a still image pre-edited by a user or according to a series of motions stored in a memory when the prior art mobile communication terminal was manufactured. Therefore, the avatar image in the prior art mobile communication terminal cannot be moved according to a user's desire.

SUMMARY OF THE INVENTION

Therefore, the present invention has been made in view of the above problems, and it is an object of the present invention to provide a mobile communication terminal capable of editing avatar motions so that an avatar can be moved according to a user's desire, and a method for editing the avatar motions.

In accordance with an aspect of the present invention, the above object can be accomplished by the provision of a mobile communication terminal comprising a memory for storing a plurality of commands corresponding respectively to a plurality of avatar motions, wherein the plurality of commands is associated with a plurality of numerals, respectively, and a controller for displaying specific avatar motions of the plurality of avatar motions in order, wherein the specific avatar motions correspond respectively to numerals included in a phone number corresponding to an incoming or outgoing call if the incoming or outgoing call is performed.

BRIEF DESCRIPTION OF THE DRAWINGS

The above object and other features and advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 1:
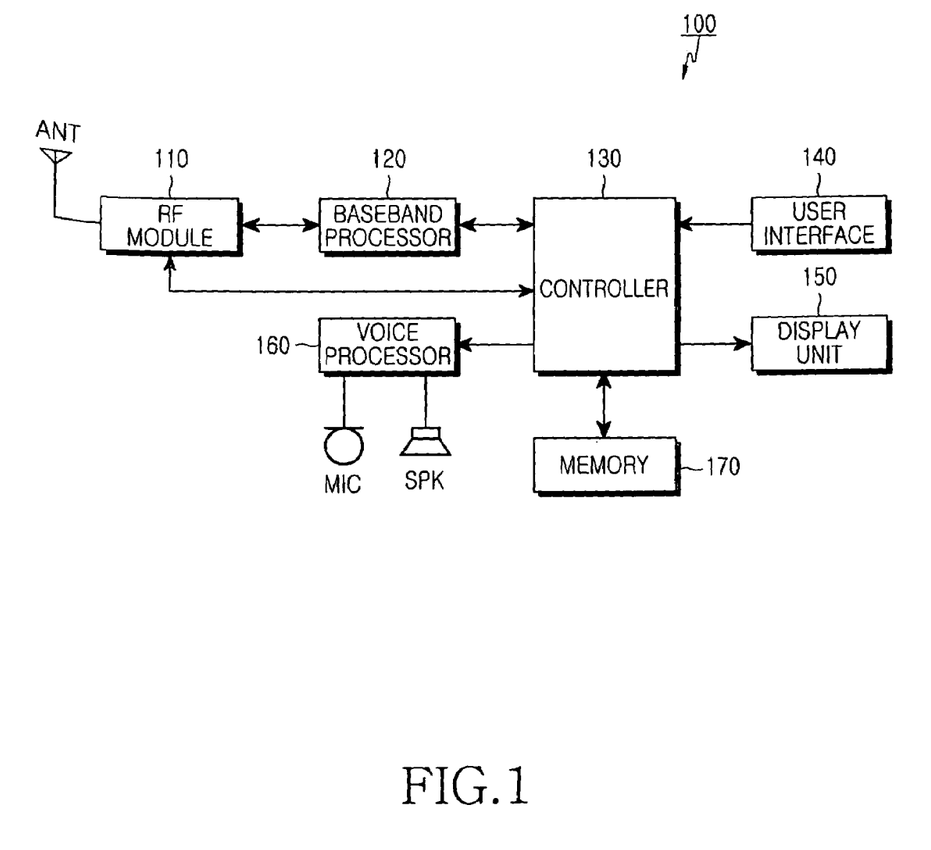
FIG. 1 is a block diagram illustrating a structure of a mobile communication terminal according to an embodiment of the present invention.

FIG. 1 is a block diagram illustrating a structure of a mobile communication terminal according to an embodiment of the present invention. A mobile communication terminal 100 includes a controller 130, a user interface 140, a display unit 150, a memory 170, a RF (Radio Frequency) module 110, a baseband processor 120 and a voice processor 160, each of which will be explained in detail below.

The controller 130 controls all operations of the mobile communication terminal 100. Also, according to the present invention, the controller 130 controls an avatar to move on the display unit 150 according to a phone number corresponding to an incoming or outgoing call. More specifically, the controller 130 displays avatar motions corresponding respectively to numerals included in the phone number of the incoming or outgoing call on the display unit 150 in order. A plurality of commands corresponding respectively to the various avatar motions are stored in the memory 170. The plurality of commands corresponding respectively to a plurality of avatar motions is stored to be associated with a plurality of numerals, respectively, in the memory 170. For example, a series of commands for an avatar to clap its hands is stored to be correlated to "1" in the memory, a series of commands for an avatar to shake its head is stored to be correlated to "2," and a series of commands for an avatar to nod its head is stored to be correlated to "3". According to an embodiment of the present invention, such plurality of avatar motions is stored to be respectively correlated to a plurality of numerals when a mobile communication terminal is manufactured. In another embodiment, the plurality of avatar motions is stored to be associated respectively with a plurality of numerals as determined by a user. Additionally, the memory 170 includes a ROM (Read-Only Memory), a RAM (Random Access Memory), a flash memory or the like, which can store a plurality of programs for controlling the mobile communication terminal 100 and data such as the commands.

The controller 130 enables a user to combine a plurality of avatar motions to generate a set of avatar motions. Here, the set of avatar motions indicates a combination of one or more avatar motions, which is achieved as the user combines numerals. Therefore, the set of avatar motions enables an avatar to move successively according to its one or more avatar motions.

More specifically, if the controller 130 receives numerals from a user in an avatar motion edit mode, it displays avatar motions corresponding respectively to the numerals on the display unit 150. The controller 130 stores combinations of numerals inputted from the user as a set of avatar motions. After that, the controller 150 enables the user to load the set of avatar motions which is pre-stored in the avatar motion edit mode. Also, the controller 130 enables an avatar to move according to predetermined conditions based on the set of avatar motions which is pre-stored in the avatar motion display mode.

The RF (Radio Frequency) module 10 transmits and receives an RF signal to and from a base station through an antenna. The RF module 110 converts the RF signal to an IF (Intermediate Frequency) signal and outputs it to the baseband processor 120. Also, the RF module 110 inputs an IF signal from the baseband processor 120 and converts it to an RF signal. After that, the RF module 110 transmits the RF signal to the base station.

The baseband processor 120 is a BAA (Baseband Analog ASIC) providing an interface between the controller 130 and the RF module 110. Also, the baseband processor 120 converts a baseband signal in digital format from the controller 130 to an IF signal in analog format to apply to the RF module 110, and converts an IF signal in analog format to a baseband signal in digital format to apply to the controller 130. The voice processor 160 converts voice data received under the control of the controller 130 to audible voice to be outputted through a speaker. Also, the voice processor 160 converts a user's voice inputted from a microphone to electrical signals to provide them to the controller 130. The user interface 140 includes a plurality of numeric keys and function keys to output key input data corresponding respectively to keys keyed by a user to the controller 130. The display unit 150 is implemented with, for example, a LCD (Liquid Crystal Display) or other suitable display, and displays various kinds of messages, icons, avatars, etc. under the control of the controller 110.

Figure 2:
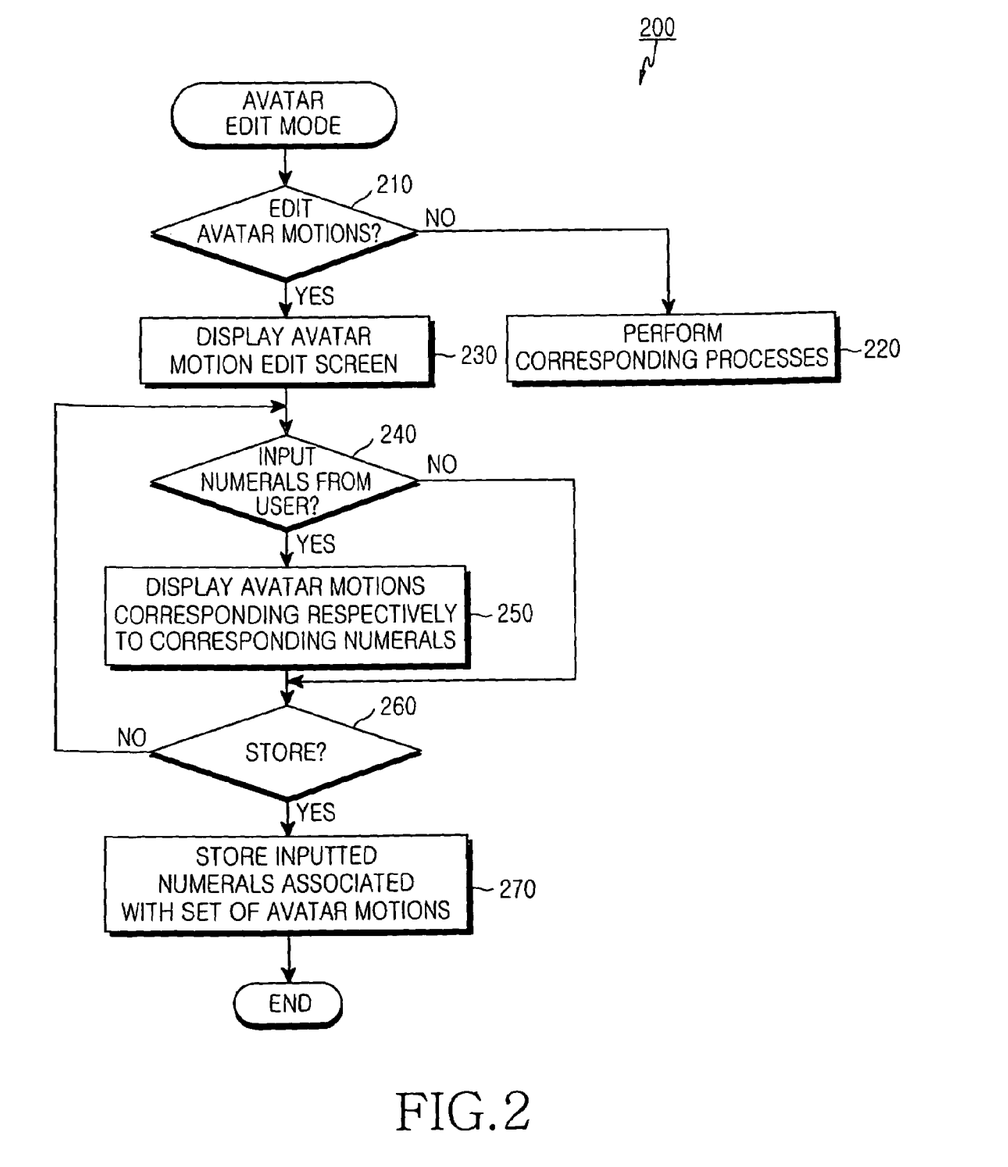
FIG. 2 is a flow chart illustrating a method for editing avatar motions according to a first embodiment of the present invention.
Figure 3A:
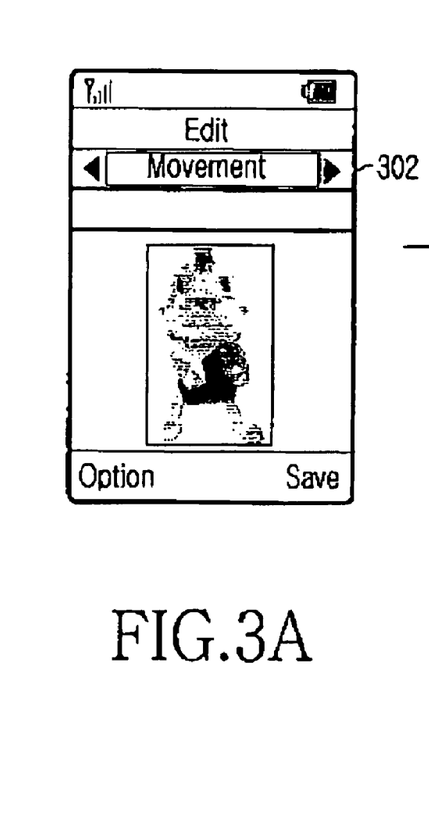
FIGS. 3A to 3C are views showing screen shots of avatar motions as they are edited based on the first embodiment of the present invention.
Figure 3B:
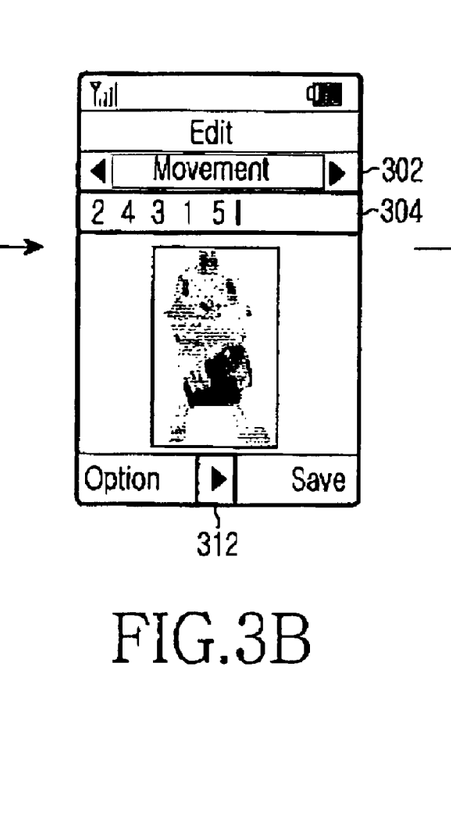
Figure 3C:
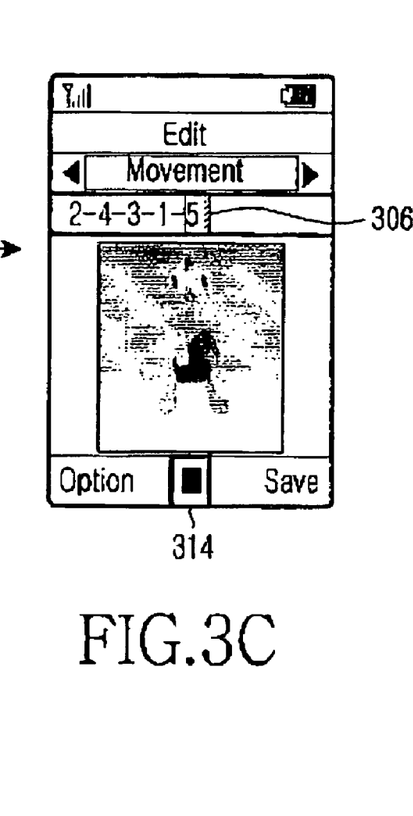

With reference to FIGS. 2 and 3, a method for editing avatar motions according to a first embodiment of the present invention will be described in detail below, as applied to a mobile communication terminal.

FIG. 2 is a flow chart illustrating of a method for editing avatar motions according to a first embodiment of the present invention.

The controller 130 of the mobile communication terminal determines whether an edit menu for editing avatar motions is selected by a user at step 210. If the edit menu is not selected by the user, but instead if a menu for editing avatar character, etc. is selected, then the controller 130 proceeds to step 220 to perform corresponding processes such as setting the avatar's type, face, emotion, and body, etc. For example, as shown in FIG. 3A, a portion indicated by a numeral reference 302 is a window for category selection. A user can select other menus in the window for category selection using a left or right key.

If the edit menu for editing avatar motions is selected, the controller proceeds to step 230 to display an edit screen for avatar motions on the display 150. After that, the controller 130 determines whether numerals are inputted from the user at step 240. If the numerals are inputted, the controller 130 proceeds to step 250 to control the avatar to perform motions corresponding to the numerals and then proceeds to step 260.

A portion indicated by a reference numeral 304 shown in FIG. 3B is a window for receiving numerals from a user. A reproduction indicator denoted by a reference numeral 312 of FIG. 3B enables an avatar to perform avatar motions corresponding respectively to inputted numerals in order. A stop indicator denoted by a reference numeral 314 of FIG. 3c enables an avatar to stop performing avatar motions corresponding respectively to inputted numerals in order. The reproduction or stop indicator is operated in a switch manner by operating a single key. Meanwhile, when an avatar is controlled to perform its motions corresponding respectively to numerals inputted by a user in order, the controller 130 enables the user to recognize current avatar motion as it indicates a numeral among the numerals using, for example, a cursor, which corresponds to the current avatar motion, as indicated by a reference numeral 306 in FIG. 3C.

The controller 130 determines whether a menu for storing inputted numerals is selected by a user at step 260. If the menu is not selected, the controller 130 returns to step 240. If the menu is selected, the controller 130 proceeds to step 270 to store the inputted numerals which are associated with a corresponding set of avatar motions.

With reference to FIG. 4 and FIGS. 5A to 5F, a method for editing avatar motions according to a second embodiment of the present invention, applied to a mobile communication terminal.

Figure 4:
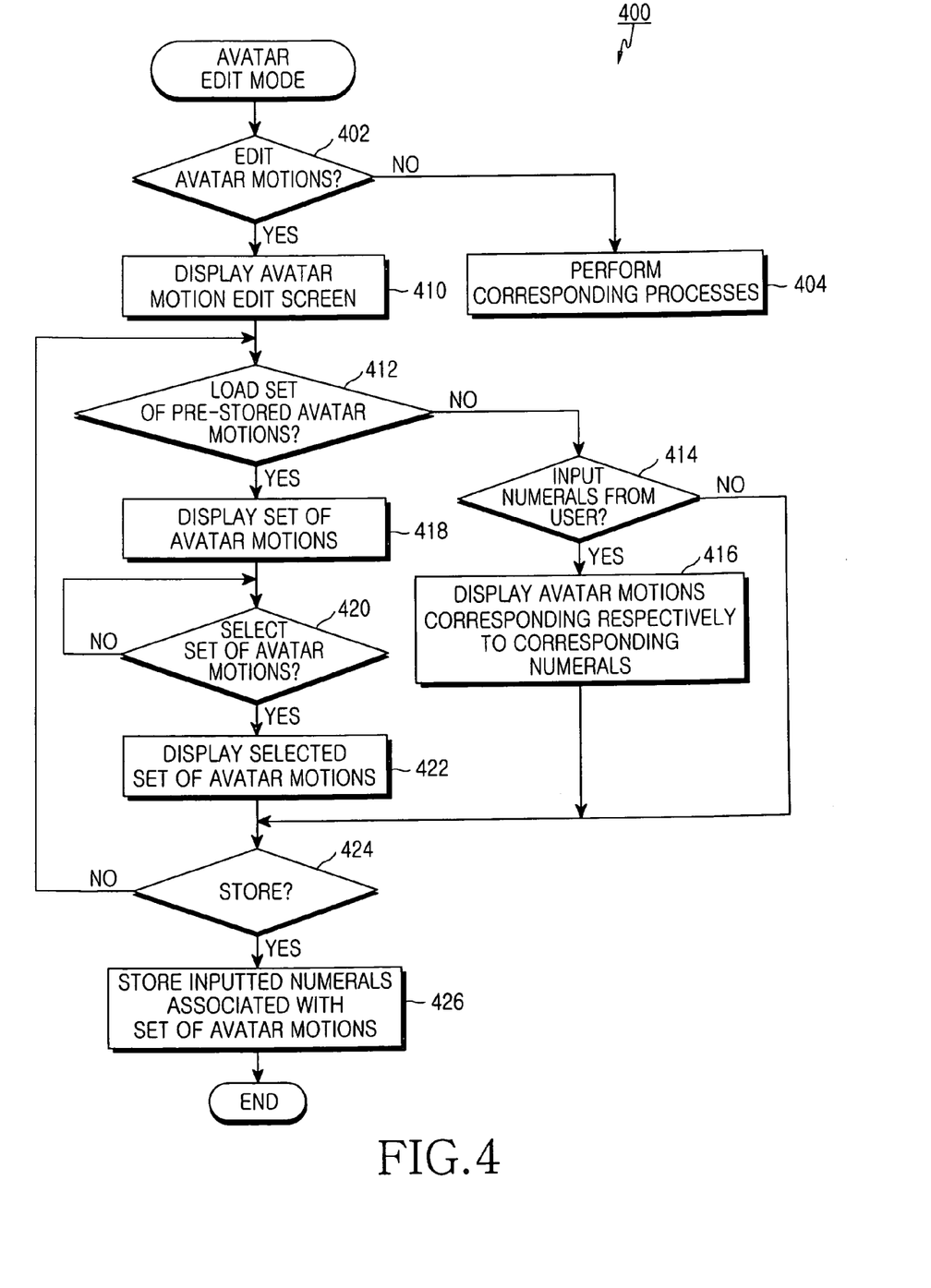
FIG. 4 is a flow chart illustrating a method for editing avatar motions according to a second embodiment of the present invention.

FIG. 4 is a flow chart which illustrates a method for editing avatar motions according to a second embodiment of the present invention. FIGS. 5A to 5F are views showing screen shots when avatar motions are edited based on the second embodiment of the present invention.

Figure 5A:
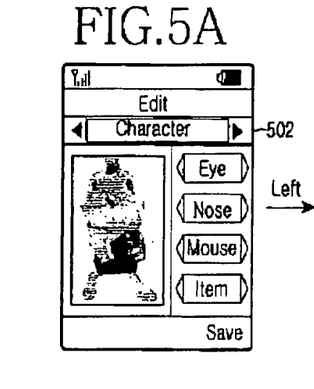
FIGS. 5A to 5F are views showing screen shots of avatar motions as they are edited based on the second embodiment of the present invention.
Figure 5B:
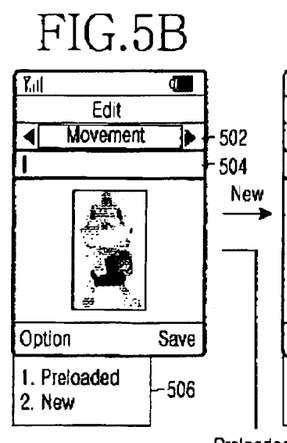

With reference to FIG. 4, the controller 130 of the mobile communication terminal determines whether an edit menu for editing avatar motions is selected by a user at step 402. As shown in FIGS. 5A and 5B, a portion indicated by reference number 502 is a window for category selection. A user can select another menu in the window for category selection using a left or right direction key. If the edit menu is not selected by the user, but instead if a menu for editing avatar character, etc. in the window for category selection (as shown in FIG. 5A.) is selected, then the controller 130 proceeds to step 404 to perform corresponding processes. After that, the menu for editing avatar character (as shown in FIG. 5A) can be moved to a menu for editing avatar motions as shown in FIG. 5B by a user using the direction keys.

Figure 5C:
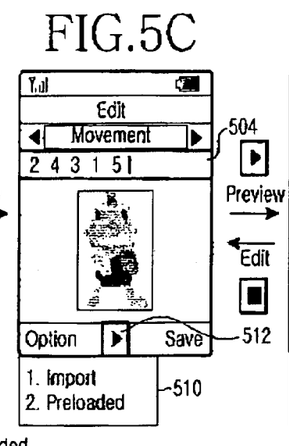
Figure 5D:
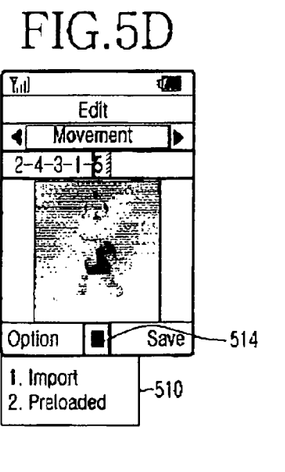

If the edit menu for editing avatar motions is selected by a user, the controller 130 proceeds to step 410 to display an edit screen for avatar motions. After that, the controller 130 determines whether a menu for loading sets of pre-stored avatar motions is selected by the user at step 412. A reference numeral 504 in a screen shot of FIG. 5B indicates a window for inputting numerals from the user. An option menu 506 as shown in FIG. 5B has a menu with two menus, 1. Preloaded, and 2. New. From this menu the user can select "1. Preloaded," for loading a set of avatar motions in a sub-menu window of the option menu. If the user does not select the "1. Preloaded" menu, which is a sub-menu of the option menu or selects menu, "2. New," in the option menu 506, the controller 130 proceeds to step 414 to receive numerals from the user. If the numerals are inputted in a window for receiving numerals by the user, the controller 130 proceeds to step 416. In step 416, the controller 130 controls the avatar to display its avatar motions corresponding respectively to numerals inputted by the user at step 414, and proceeds to step 424. FIGS. 5C and 5D are views showing screen shots in an avatar movement edit mode, in which avatar motions are edited as a user inputs numerals thereto. A reproduction indicator denoted by a reference numeral 512 in the screen shot of FIG. 5C and a stop indicator denoted by a reference numeral 514 in the screen shot of FIG. 5D are the same as the corresponding symbols which are shown in FIGS. 3A to 3C, respectively. Here, since the reproduction indicator 512 is provided to show avatar motions corresponding respectively to numerals selected by the user on the display unit 150, its operation is similar to a preview function. As the stop indicator 514 is provided to stop displaying avatar motions corresponding respectively to inputted numerals on the display unit 150.

Figure 5E:
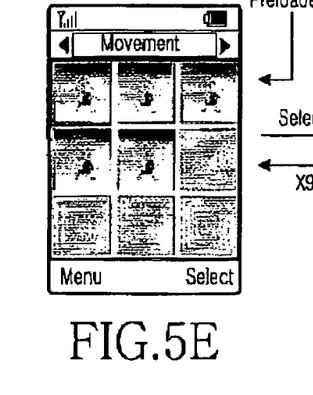

Meanwhile, if the menu for loading sets of pre-stored avatar motions (i.e., the "1. Preloaded" as shown in FIG. 5C) is selected by a user, the controller 130 proceeds to step 418 to display a list of the sets of pre-stored avatar motions on the display unit 150. The controller 130 determines whether a specific set in the list is selected by a user at step 420. If the specific set is selected, the controller 130 proceeds to step 422. The controller 130 controls the avatar to display avatar motions based on the selected set on the display unit 150. FIG. 5E is a screen shot displaying a list of sets of avatar motions if the menu for loading a set of pre-stored avatar motions is selected by a user. The user can select one of the sets of avatar motions using, for example, direction keys, etc. Each set of avatar motions in the list can be pre-stored by a manufacturer of mobile communication terminals or by users.

Referring to FIG. 4, the controller 130 determines whether a menu for storing inputted numerals is selected by a user at step 424. If the menu is selected, the controller 130 proceeds to step 426 to store the inputted numerals associated with the set of avatar motions, respectively. Meanwhile, if the menu is not selected, the controller 130 returns to step 412.

Figure 5F:
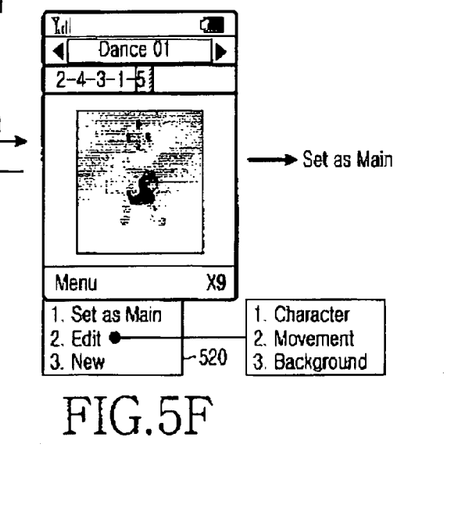

As shown in FIG. 4, if the storing menu is not selected by a user after steps 414 and 416, the controller 130 returns to step 412 and loads a set of avatar motions pre-stored by a user. Namely, although numerals corresponding respectively to avatar motions are inputted, the user can load a set of pre-stored avatar motions. Also, if the storing menu is not selected by a user after steps 418, 420, and 422, the controller returns to step 412 to input numerals corresponding respectively to avatar motions from the user. Namely, the user can input numerals corresponding respectively to avatar motions, even after a set of avatar motion is loaded. As shown in the screen shots of FIGS. 5C and 5D, although numerals corresponding respectively to avatar motions are inputted by a user, a set of pre-stored motions can be loaded through the import menu (i.e., "1. Import,"), which is as a sub menu window of the option menu 510. Also, as mentioned above, the menu (i.e., "2. Preloaded), for loading sets of pre-stored avatar motions can load sets of pre-stored avatar motions. Here, unlike the import menu, the menu for loading sets of pre-stored avatar motions displays only sets of avatar motions stored after deleting numerals corresponding respectively to avatar motions, inputted by a user. Also, FIG. 5F is a screen shot of a screen which is displayed if a menu for loading sets of avatar motions is selected, in which the menu includes a setting menu which contains the following menus: "1. Set as Main," for setting a loaded set of avatar motions to corresponding set of avatar motions, an edit menu, "2. Edit," for editing corresponding set of avatar motions, and a generation menu, "3. New," for generating a new set of avatar motions. Here, the edit menu includes sub-menus with are associated with the avatar edit menu (i.e., "2. Edit," seen in menu 520), which are defined as follows: "1. Character," an avatar motion edit menu, "2. Motion," and a background menu for setting a background on which an avatar is displayed, and "3. Background."

Figure 6:
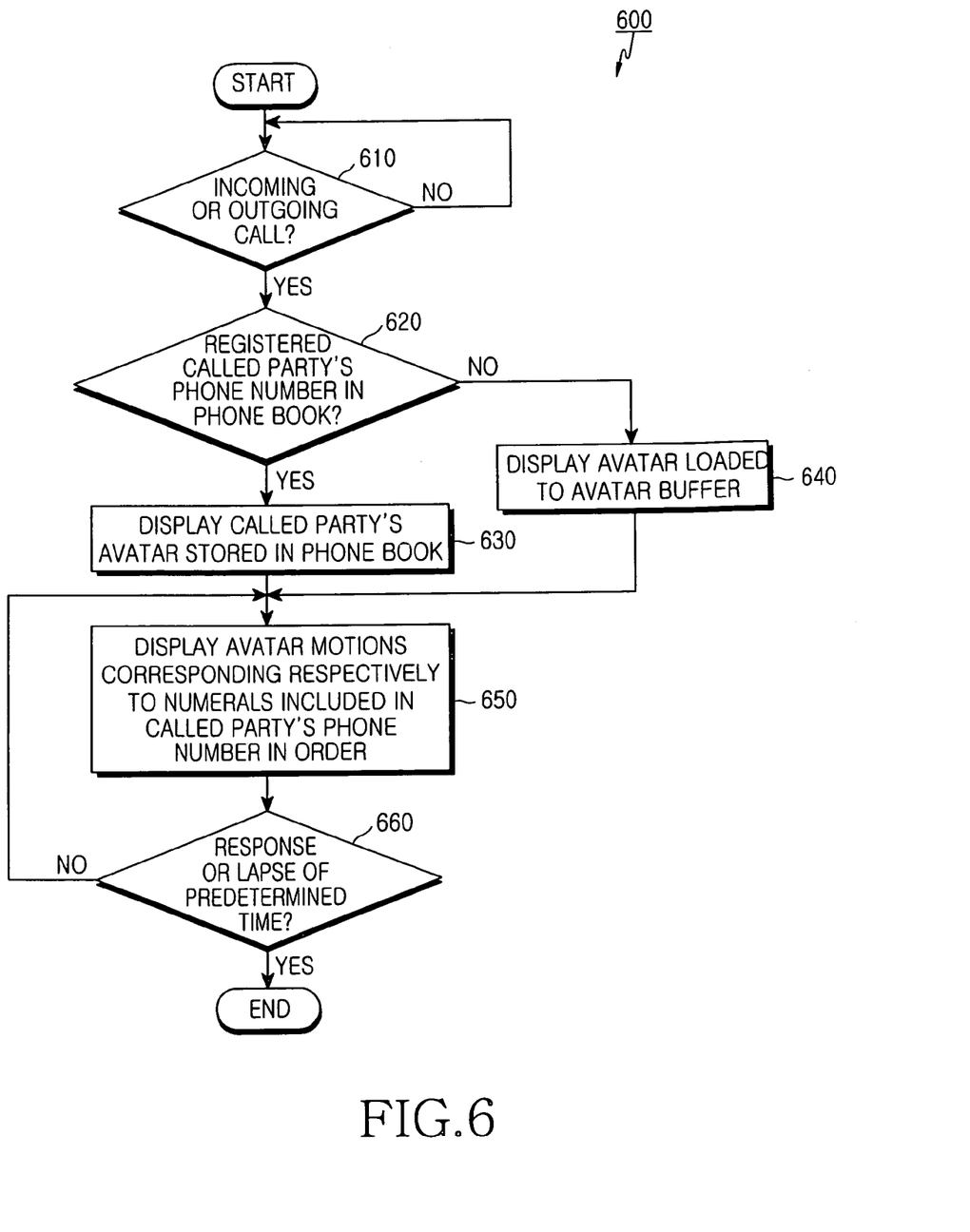
FIG. 6 is a flow chart illustrating a method for controlling avatar motions according to a first embodiment of the present invention.
Figure 7:
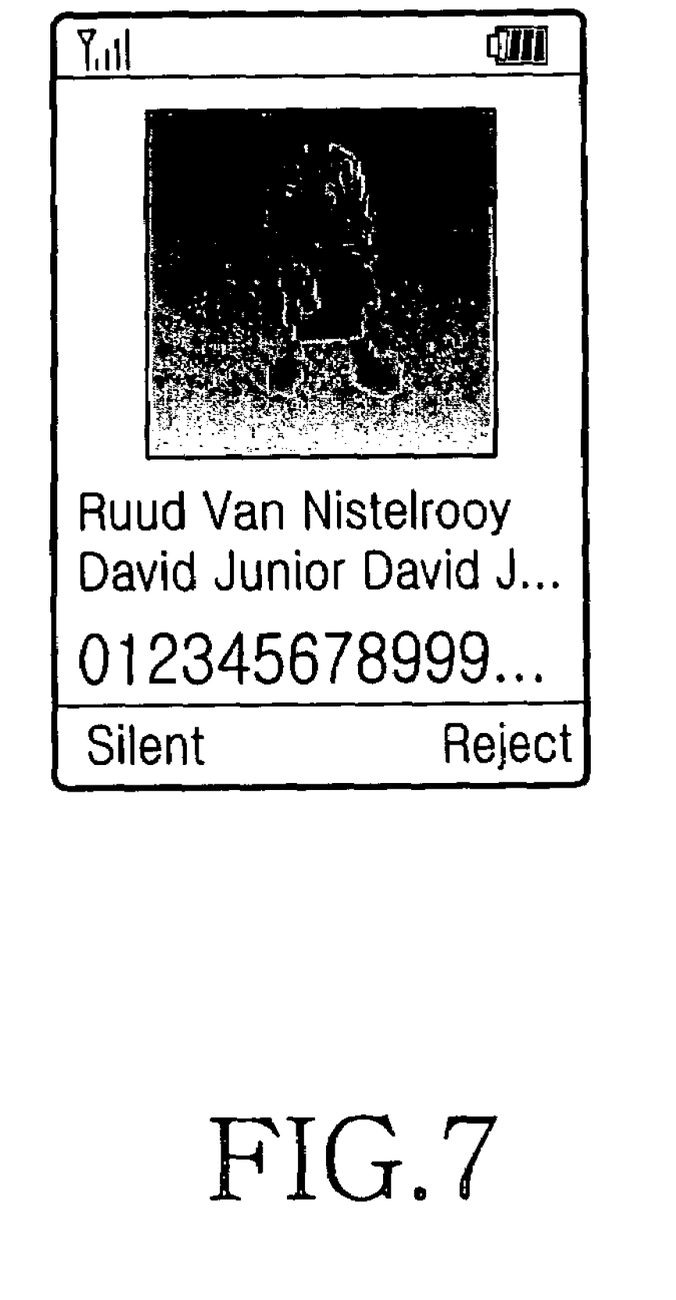
FIG. 7 is a view showing a screen shot when an avatar motion according to the present invention is displayed.

With reference to FIGS. 6 and 7, avatar motions according to a first embodiment of the present invention will be described below.

FIG. 6 is a flow chart illustrating a method for controlling avatar motions according to a first embodiment of the present invention. FIG. 7 is a view showing a screen shot when displaying avatar motion according to the present invention.

With reference to FIG. 6, the controller 130 determines whether there is an incoming or outgoing call at step 610. If there is an incoming or outgoing call, the controller 130 determines whether a called party's phone number corresponding to the incoming or outgoing call is registered in a phone book as shown in step 620. If the called party's phone number is registered, the controller 130 proceeds to step 630 to display an avatar corresponding thereto on the display unit 150, in which the avatar is pre-stored in the phone book. Meanwhile, if the called party's phone number is not registered, the controller 130 displays an avatar loaded to an avatar buffer on the display unit 150 at step 640. Here, the avatar loaded into the avatar buffer indicates an avatar which was previously displayed on the display unit 150. Namely, if an avatar corresponding to a phone number is not stored, the controller 130 displays the avatar which was last displayed on the display unit 150.

The controller 130 displays avatar motions corresponding respectively to numerals included in the called party's phone number on the display unit 150 in order at step 650. After that, the controller 130 checks whether an incoming call is responded to by a user or whether an outgoing call is responded to by a called party, at step 660. The controller 130 displays avatar motions corresponding respectively to numerals included in a called party's phone number on the display unit 150 in order until there is a response to an incoming or outgoing call or a predetermined time has lapsed. For example, if a phone number of an incoming or outgoing call is "012345678999" as shown in FIG. 7, the controller 130 controls an avatar to display its motions corresponding respectively to numerals of the phone number on the display unit 150 in order.

Also, with reference to FIG. 8, avatar motions according to a second embodiment of the present invention will be described in detail below.

Figure 8:
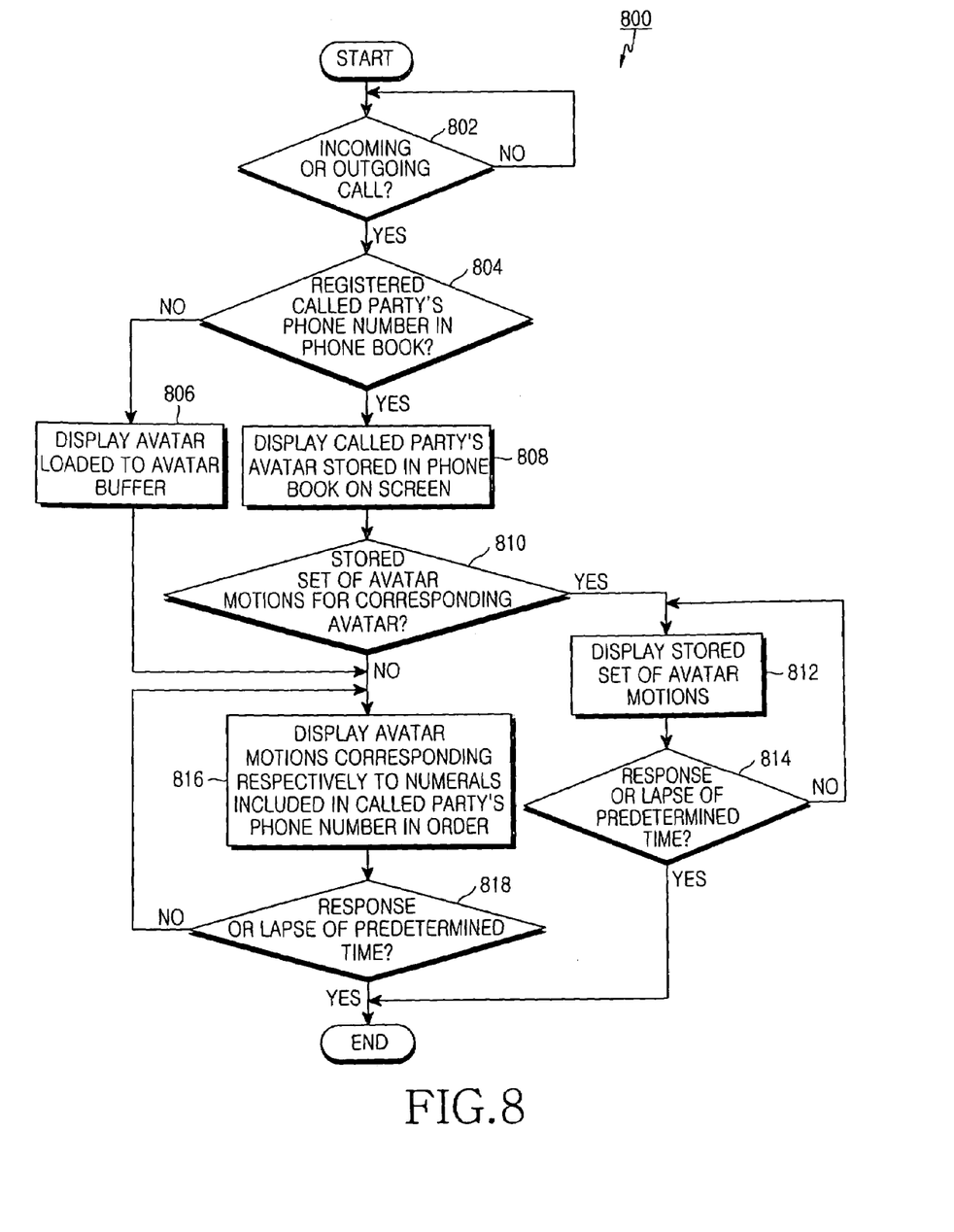
FIG. 8 is a flow chart illustrating a method for controlling avatar motions according to a second embodiment of the present invention.

FIG. 8 is a flow chart illustrating a method for controlling avatar motions according to a second embodiment of the present invention. The controller 130 determines whether there is an incoming or outgoing call at step 802. If there is an incoming or outgoing call, the controller 130 determines whether a called party's phone number corresponding to the incoming or outgoing call is registered in a phone book at step 804. If the called party's phone number is registered, the controller 130 proceeds to step 808 and displays a called party's avatar stored in the phone book on the display unit 150. After that, the controller 130 determines whether a set of avatar motions for the corresponding stored avatar is stored at step 810. If the set of avatar motions is not stored, the controller 130 proceeds to step 816.

Meanwhile if the called party's phone number corresponding to the incoming or outgoing call is not registered, the controller 130 displays an avatar loaded to an avatar buffer on the display unit 150 at step 806 and proceeds to step 816. As mentioned above, the avatar loaded to the avatar buffer is the avatar which was displayed last on the display unit 150 of the mobile communication terminal.

The controller 130 displays avatar motions corresponding respectively to numerals included in the called party's phone number on the display unit 150 in order at step 816. After that, the controller 130 checks whether an incoming call is responded to by a user or whether an outgoing call is responded to by a called party, at step 818. The controller 130 displays avatar motions corresponding respectively to numerals in the called party's phone number on the display unit 150 in order until there is a response to the incoming or outgoing call or a predetermined time has lapsed.

Meanwhile, in step 810, if a set of avatar motions for a corresponding stored avatar is stored, the controller 130 proceeds to step 812 to display the set of avatar motions on the display unit 150. After that, the controller 130 checks whether an incoming call is responded to by a user or whether an outgoing call is responded to by a called party, at step 814. The controller 130 displays the set of avatar motions stored for the corresponding stored avatar until there is a response to the incoming or outgoing call or a predetermined time has lapsed.

As described above, the mobile communication terminal according to the present invention enables a user to edit avatar motions as he or she desires.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal comprising:
   a memory for storing a plurality of commands corresponding respectively to a plurality of avatar motions, wherein the plurality of commands are associated with a plurality of numerals, respectively; and
   a controller for displaying specific avatar motions of the plurality of avatar motions in order, wherein the specific avatar motions correspond respectively to the plurality of numerals included in a phone number corresponding to an incoming or outgoing call if the incoming or outgoing call is performed.

2. The mobile communication terminal as set forth in claim 1, wherein the plurality of commands are stored to be associated with the plurality of numerals, respectively, in the memory when the mobile communication terminal is manufactured.

3. The mobile communication terminal as set forth in claim 1, wherein the plurality of commands are stored to be associated with the plurality of numerals, respectively, in the memory by a user.

4. A mobile communication terminal comprising:
   a memory for storing a plurality of commands corresponding respectively to a plurality of avatar motions, wherein the plurality of commands are associated with a plurality of numerals, respectively; and
   a controller for displaying specific avatar motions corresponding respectively to the plurality of numerals inputted by a user in an avatar motion edit mode for editing the plurality of avatar motions, storing a combination of said numerals inputted by the user in the memory, associated with a set of avatar motions showing a combination of more than one avatar motion, and controlling an avatar to display the set of avatar motions in an avatar display mode.

5. The mobile communication terminal as set forth in claim 4, wherein the controller enables the user to load the set of avatar motions which was previously stored in the memory in the avatar motion edit mode.

6. The mobile communication terminal as set forth in claim 4, wherein the avatar display mode is begun when the controller determines that an incoming or outgoing call is performed.

7. A method for editing avatar motions comprising:
   storing a plurality of commands corresponding respectively to a plurality of avatar motions, wherein the plurality of commands are associated with a plurality of numerals, respectively; and
   displaying specific avatar motions of the plurality of avatar motions in order, wherein the specific avatar motions correspond respectively to the plurality of numerals included in a phone number corresponding to an incoming or outgoing call if the incoming outgoing call is performed.

8. A method for editing avatar motions comprising:
   storing a plurality of commands corresponding respectively to a plurality of avatar motions, wherein the plurality of commands are associated with a plurality of numerals, respectively;
   displaying specific avatar motions corresponding respectively to the plurality of numerals inputted by a user in an avatar motion edit mode for editing the plurality of avatar motions;
   storing a combination of numerals inputted by the user in the memory, associated with a set of avatar motions showing a combination of more than one avatar motion; and
   controlling an avatar to display the set of avatar motions in an avatar display mode.

* * * * *